(12) United States Patent
Chen et al.

(10) Patent No.: US 9,864,200 B2
(45) Date of Patent: Jan. 9, 2018

(54) HEAD-MOUNTED DISPLAY

(71) Applicant: SHENZHEN ROYOLE TECHNOLOGIES CO. LTD., Shenzhen (CN)

(72) Inventors: Songya Chen, Shenzhen (CN); Songling Yang, Shenzhen (CN)

(73) Assignee: SHENZHEN ROYOLE TECHNOLOGIES CO. LTD., Shenzhen, Guangdong (CN)

( * ) Notice: Subject to any disclaimer, the term of this patent is extended or adjusted under 35 U.S.C. 154(b) by 9 days.

(21) Appl. No.: 15/059,111

(22) Filed: Mar. 2, 2016

(65) Prior Publication Data
US 2017/0075121 A1 Mar. 16, 2017

Related U.S. Application Data

(63) Continuation of application No. PCT/CN2015/089564, filed on Sep. 14, 2015.

(51) Int. Cl.
*G06F 3/041* (2006.01)
*G02B 27/01* (2006.01)

(52) U.S. Cl.
CPC ....... *G02B 27/0176* (2013.01); *G06F 3/0416* (2013.01); *G02B 2027/0192* (2013.01)

(58) Field of Classification Search
CPC ........ G02B 2027/0192; G02B 27/0176; G06F 3/0416

(Continued)

(56) References Cited

U.S. PATENT DOCUMENTS 6,369,952 B1 * 4/2002 Rallison ............... G02B 27/017
359/630
2004/0201695 A1 * 10/2004 Inasaka .................. H04N 5/77
348/207.99

(Continued)

FOREIGN PATENT DOCUMENTS

CN 103596099 A 2/2014
CN 104166239 A 11/2014

(Continued)

OTHER PUBLICATIONS

Shenzhen Royole Technologies Co., Ltd., International Search Report and Written Opinion, PCT/CN2015/089564, dated May 27, 2016, 7 pgs.

*Primary Examiner* — Tony Davis
(74) *Attorney, Agent, or Firm* — Morgan, Lewis & Bockius LLP

(57) ABSTRACT

The present application provides a head-mounted display, including a display device comprising a display body and two support arms extending from opposite ends of the display body, a headphone device comprising two headphone bodies, and two connection mechanisms connected to the two support arms respectively and rotatably connected to the two headphone bodies respectively. A head-mounted bracket is connected to the two connection mechanisms via two connection portions. Each connection mechanism includes a first rotation member for connecting a support arm to a corresponding headphone body and a second rotation member rotatably connected to the first rotation member and connected to a corresponding connection portion, respectively. The display device is driven to rotate relative to the head-mounted bracket under the first rotation member rotating relative to the second rotation member, which enables the display device to be folded together with (Continued)

the head-mounted bracket to improve portability of the product.

12 Claims, 6 Drawing Sheets

(58) Field of Classification Search
USPC .......................................................... 359/630
See application file for complete search history.

(56) References Cited

U.S. PATENT DOCUMENTS

| | | | | |
|---|---|---|---|---|
| 2012/0244813 | A1* | 9/2012 | Liao | H04R 1/1091 455/41.3 |
| 2014/0133670 | A1* | 5/2014 | Lee | H04R 5/0335 381/74 |
| 2014/0272915 | A1* | 9/2014 | Higashino | B06B 1/16 434/365 |
| 2014/0364208 | A1* | 12/2014 | Perry | A63F 13/00 463/31 |
| 2014/0364209 | A1* | 12/2014 | Perry | G06F 3/013 463/31 |
| 2016/0249124 | A1* | 8/2016 | Drinkwater | H04R 1/105 |
| 2016/0349519 | A1* | 12/2016 | Yang | G02B 27/0176 |
| 2017/0052378 | A1* | 2/2017 | Yang | G02B 27/0176 |
| 2017/0055061 | A1* | 2/2017 | Yang | H04R 1/1066 |
| 2017/0055079 | A1* | 2/2017 | Yang | H04R 5/0335 |
| 2017/0075121 | A1* | 3/2017 | Chen | G02B 27/0176 |
| 2017/0090201 | A1* | 3/2017 | Guo | G02B 27/0176 |

FOREIGN PATENT DOCUMENTS

| | | |
|---|---|---|
| CN | 204229050 U | 3/2015 |
| CN | 104503585 A | 4/2015 |
| CN | 204302573 U | 4/2015 |
| CN | 204666953 U | 9/2015 |
| JP | 2007243631 A | 9/2007 |
| WO | WO2007119351 A1 | 10/2007 |

* cited by examiner

HEAD-MOUNTED DISPLAY

RELATED APPLICATION

This patent application is a continuation application of PCT Patent Application No. PCT/CN2015/089564, entitled "HEAD-MOUNTED DISPLAY" filed on Sep. 14, 2015, which is incorporated by reference in its entirety.

TECHNICAL FIELD

The present disclosure relates to wearable displays and in particular to a head-mounted display.

BACKGROUND

Head-mounted display utilizes near-eye display method to enlarge images displayed on a micro display by a group of optical system (mainly composed of precise optical lens), and further projects the enlarged images to retina of eyes, so as to show large screen display effect for users. Because the shape of the head-mounted display is similar to glasses, the head-mounted display is also called video glasses.

Most of current products, head-mounted display can be used by plugging an earplug-style earphone thereunto via wires or some current products is equipped with embedded headphone. However, head-mounted display assembled with earphone wire is inconvenient to carry, and the combination with the embedded headphone and head-mounted display make the size of the head-mounted display too big. Therefore, how to improve the portability of the head-mounted display becomes a problem need to be resolved.

SUMMARY

The present application provides a head-mounted display to overcome the above technical problem, the display including:

a display device comprising a display body and two support arms extending from opposite ends of the display body for displaying a video;

a headphone device comprising two headphone bodies for playing an audio synchronized with the video; and two connection mechanisms connected to the two support arms respectively and rotatably connected to the two headphone bodies respectively.

The head-mounted display in the present application further includes a head-mounted bracket comprising a head-mounted portion and two connection portions extending from opposite ends of the head-mounted portion. The two connection portions are connected to the two connection mechanisms respectively. Each connection mechanism further includes a first rotation member for connecting a support arm to a corresponding headphone body and a second rotation member rotatably connected to the first rotation member; the second rotation being connected to the corresponding connection portion.

The display device and the head-mounted bracket are driven to rotate relative to each other when the first rotation member rotates relative to the second rotation member, which provides a flexible connection manner. Thus the display device and the head-mounted bracket can be folded together to carry around, which enhances portability of the product.

DETAILED DESCRIPTION

Figure 1:
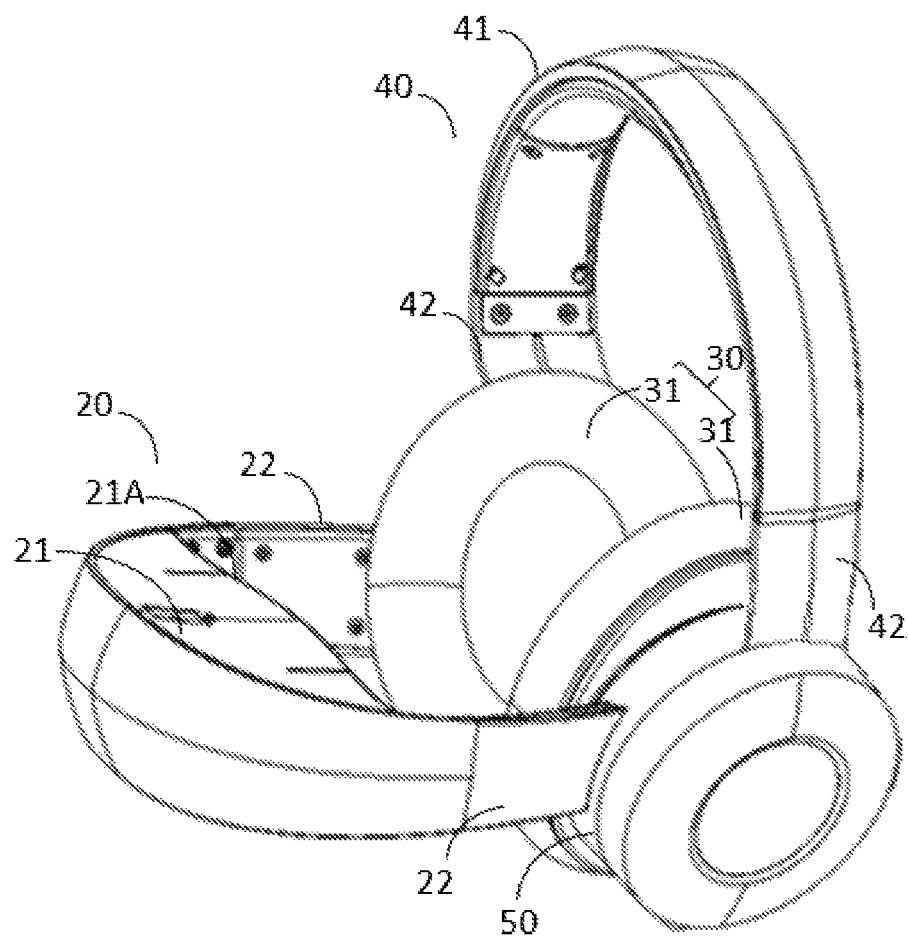
FIG. 1 is a perspective view of a head-mounted display in accordance with an exemplary embodiment of the present application.

To better understand purposes, technical solutions, and advantages of the present application, the following will further illustrate the present application in combination with various embodiments and the accompanying drawings. It should be understood that the specific embodiments described herein are merely used to illustrate the present application, and are not a limitation of the present application.

In the description of the present application, the "first", "second" are merely used for description, and cannot be understood to indicate or imply relative importance or implicitly indicate the number of the indicated technical features. Therefore, features with a limitation of "first" or "second" can explicitly or implicitly include one or more feature. In the description of the present application, "multiple" means two or more than two, unless there is specific limitation.

In the description of the present application, it should be noted that, unless explicitly stated or limited, the terms "mount", "connected" and "connection" should be broadly understood, for example, it may be a fixed connection, or may be a detachable connection, or integral connection; it may be a mechanical connection, or may be an electrical connection, or may be communication with each other; it may be directly connected, or may be indirectly connected via intermediary, or may be communication between interiors of two elements or interactions between two elements. Those skilled in the art can understand the specific definition of above terms in the present application according to specific conditions.

The following disclosure provides many different embodiments or examples, for realize different structures of the present application. In order to simplify the present disclosure, the following will describe components and setting of specific examples. Certainly, thereby are just examples, and are not intended to limit the present application. Furthermore, in the present application, reference numerals and/or reference letters may be repeated in different embodiments. This repetition is for the purpose of simplicity and clarity, and does not indicate relationships among various embodiments and/or settings discussed herein.

Figure 2:
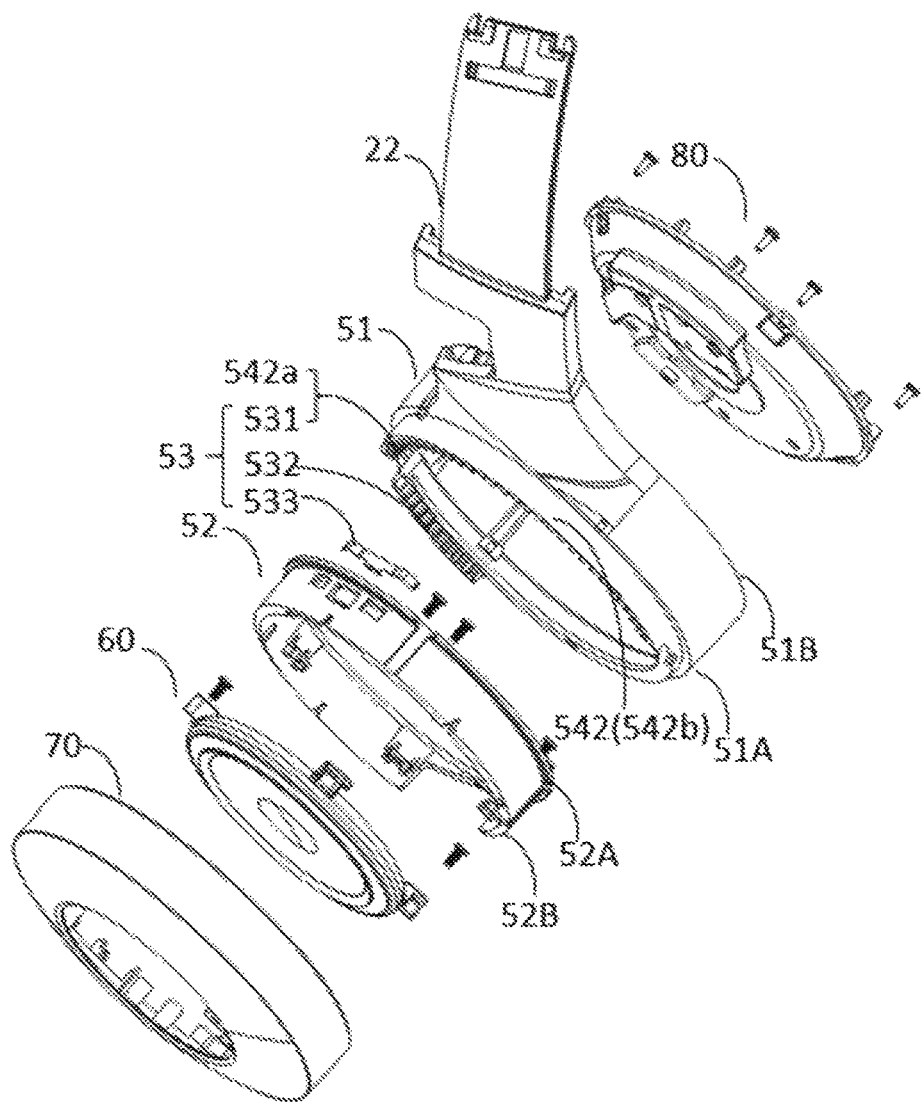
FIG. 2 is an exploded view of the connection mechanism of the head-mounted display in accordance with an exemplary embodiment of the present application.
Figure 3:
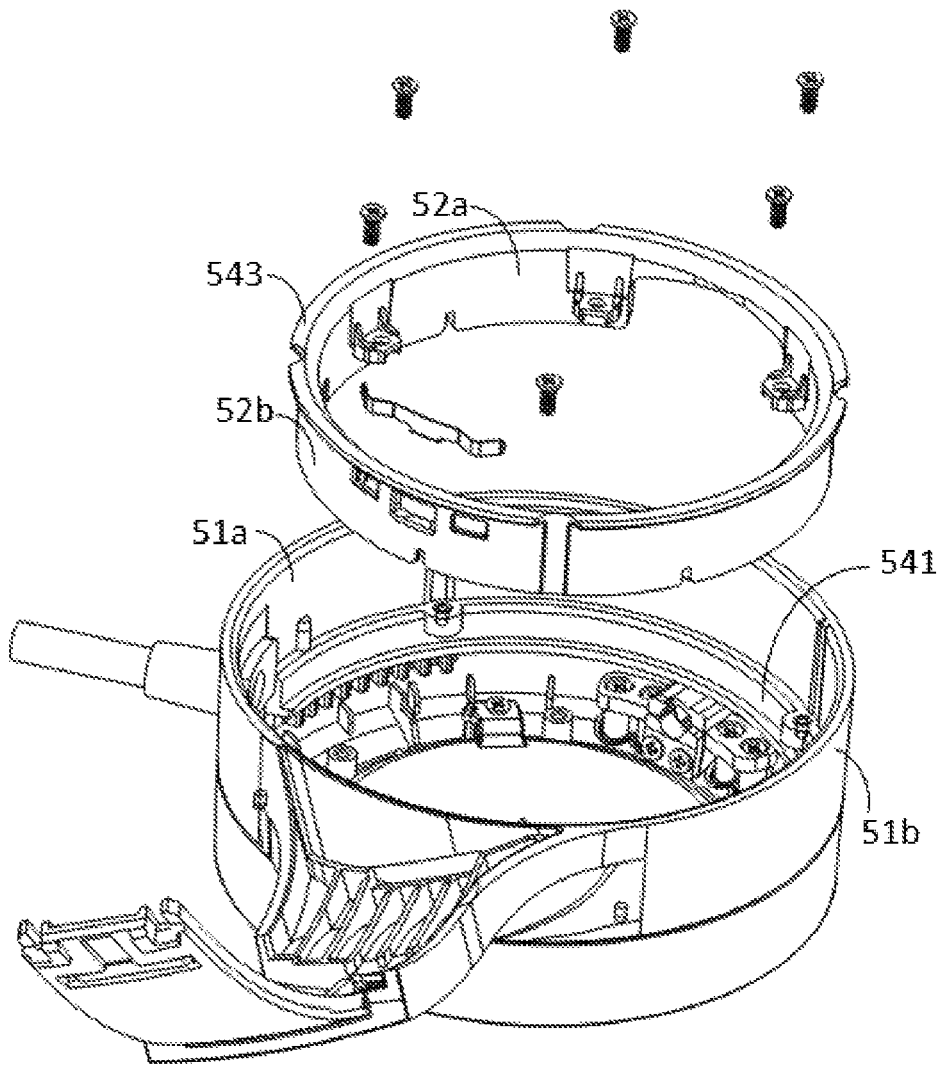
FIG. 3 is an assembled view of the first rotation member and the second rotation member in FIG. 2.
Figure 4:
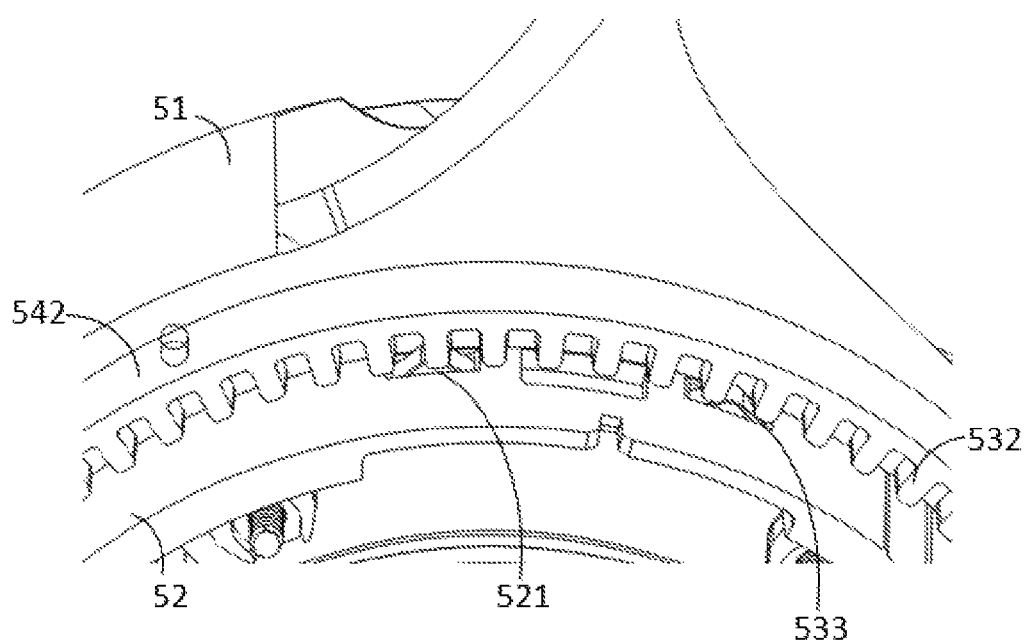
FIG. 4 is a partial enlarged view of the gear structure after the gear structure in FIG. 3 is assembled.

Referring to FIG. 1, a head-mounted display is provided in an embodiment of the present application. The head-mounted display includes a display device 20, a headphone device 30, a head-mounted bracket 40, and a connection mechanism 50. The display device 20 includes a display body 21 having a displaying side 21A and two support arms 22. The display side 21A is used for projecting images to eyes of a user. The support arms 22 extend from opposite ends of the display body 21 in a direction toward the displaying side 21A, which forms a shape similar to the shape of a pair of glasses. The display body 21 of the display device 20 is used for displaying a video. The headphone device 30 includes two headphone bodies 31 for outputting audio signal and playing an audio synchronized with the video. The head-mounted bracket 40 includes a head-mounted portion 41 and two connection portions 42 extending from opposite ends of the head-mounted portion 41. The two connection mechanisms 50 are used to connect the arms 22 of the display body 21 to the corresponding headphone body 31 and the corresponding connection portion 42 respectively. Referring also to FIGS. 2-4, each connection mechanism 50 includes a first rotation member 51 and a second rotation member 52. The first rotation member 51 connects the corresponding support arm 22 to the corresponding headphone body 31. The second rotation member 52 is rotatably connected to the first rotation member 51, and is further connected to the corresponding connection portion 42.

The above embodiment of the present application provides a head-mounted display, which includes a connection mechanism 50 for connecting the display device 20, the headphone device 30, and the head-mounted bracket 40. The connection mechanism 50 includes a first rotation member 51 for connecting the corresponding support arm 22 to the corresponding headphone body 31 and the second rotation member 52. The second rotation member 52 is rotatably connected to the first rotation member 51 and it is further connected to the corresponding connection portion 42. The display device 20 and the head-mounted bracket 40 are driven to rotate relative to each other when the first rotation member 51 rotates relative to the second rotation member 52, which provides a flexible connection manner, thus the display device 20 and the head-mounted bracket 40 can be folded together to carry around, which enhances portability of the product.

In the embodiment, at least one of the two connection mechanisms 50 includes a gear structure 53. The gear structure 53 includes a tooth-shaped structure 532 which is arranged at a circle wall 531 of one of the first rotation member 51 and the second member 52, and an elastic sheet 533 which is mounted to the other one of the first rotation member 51 and the second rotation member 52 and engages the tooth-shaped structure 532. The first rotation member 51 and the second rotation member 52 rotate relative to each other by the tooth-shaped structure 532 and the elastic sheet 533 under an external force. With the engagement between the tooth-shaped structure 532 and the elastic sheet 533, the head-mounted bracket 40 keeps a predefined fixed angle with the display device 20. The elastic sheet 533 is deformed by an external force and slides relative to the tooth-shaped structure 532, which enables the display device 20 to rotate around an axis extending through the axle center of the headphone bodies 31. To be sure, only one of the connection mechanisms 50 includes the gear structure 53, or both connection mechanisms 50 include the gear structure 53, to ensure that the head-mounted bracket 40 keep a predefined fixed angle with the display device 20.

In some cases, when both connection mechanisms 50 include the gear structure 53, if operated improperly, for example, when the display device 20 and the head-mounted bracket 40 are pulled toward one of the connection mechanisms 50, the force applied to the other gear structure 53 is relatively small and the rotations of the two gear structures 53 are not consistent. Thus the device may be broke down easily. This problem can be solved with only one of the connection mechanisms 50 having the gear structure 53 and the gear structure 53 set in one of the connection mechanisms 50 driving the other connection mechanism 50 to rotate together with the one of the connection mechanisms 50.

The above embodiment of the present application includes the connection mechanism 50 for connecting the display device 20, the headphone device 30, and the head-mounted bracket 40. The connection mechanism 50 includes the gear structure 53 having the tooth-shaped structure 532 and the elastic sheet 533. Under an external fore, the connection mechanism 50 drives the display device 20 to rotate relative to the head-mounted bracket 40 by virtue of the relative rotation of the tooth-shaped structure 532 and the elastic sheet 533, which provides a flexible connection manner to allow the display device 30 to be folded together with the head-mounted bracket 40, to enhance the portability of the product.

Specifically, the first rotation member 51 includes a latching wall 51A having a latching structure 54, and a wall 51B opposite to the latching wall 51A. The second rotation member 52 includes a latching wall 52A having a latching structure 54 and a wall 52B opposite to the latching wall 52A. The gear structure is arranged at the latching wall 51A, 52A. In a preferred embodiment, the first rotation member 51 and the second rotation member 52 are in the form of an annular frame, which includes an inner circle wall 51*a* or 52*a* and an outer circle wall 51*b* or 52*b*. The diameter of the first rotation member 51 is different from the diameter of the second rotation member 52. Furthermore, one of the first rotation member 51 and the second rotation member 52, which has a greater diameter, includes a first joint portion 541 extending from the latching wall 51A or 52A toward the center of the annular frame, and a second joint portion 542 extending from the first joint portion 541 in a direction opposite to the opposite wall 51B or 52B. Specifically, the second joint portion 542 can be used to configure the circle wall 531 and the tooth-shaped structure 532 of the gear structure 53. One of the first rotation member 51 and the second rotation member 52, which has a smaller diameter, includes a third joint portion 543 extending from the latching wall 52A or 51A toward the center of the annular frame. The first joint portion 541 fits with the third joint portion 543. Thus, the third joint portion 543 extends through one of the first rotation member 51 and the second rotation member 52 having a greater diameter and further engages the first joint portion 541, and the opposite wall 51B or 52B of one of the first rotating member 51 and the second rotation member 52B having a smaller diameter extends through and further extends out of the one of the first rotating member 51 and the second rotation member 52B having a greater diameter, which enables the first rotation member 51 to rotatably engage the second rotation member 52. The structure of the other connection mechanism 50 is the same to the above description, the difference therebetween is that there is no the mentioned elastic sheet 533, or there is no the mentioned elastic sheet 533 and the tooth-shaped structure 532 in the other connection mechanism 50.

For purpose of illustrating the above principle, the following in combination with an embodiment is for specifically illustration. In the embodiment, the diameter of the first rotation member 51 is greater than the second rotation member 52. However, the present application is not limited thereto.

The second joint portion 542 of the first rotation member 51 is a concentric annular ring extending from the annular frame. The concentric annular ring includes the inner circle wall 542*a* and the outer circle wall 542*b*. In the embodiment, the circle wall 531 and the tooth-shaped structure 532 of the gear structure 53 is arranged at the second joint portion 542. Specifically, the tooth-shaped structure 532 is arranged at the inner circle wall 542a of the concentric annular ring. It is understood that the inner circle wall 542a of the concentric annular ring can act as the circle wall 531 of the gear structure 53. The elastic sheet 533 of the gear structure 53 is fixed to the second rotation member 52. When the third joint portion 543 of the second rotation member 53 extends through the first rotation member 51 and further engages the first joint portion 541 by press fitting, the elastic sheet 533 engages the tooth-shaped structure 532 correspondingly.

Specifically, in the embodiment, an elastic sheet fixing portion 521 is arranged at the annular frame of the second rotation member 52. The elastic sheet fixing portion 521 is located at a position corresponding to the tooth-shaped structure 532 after the second rotation member 52 engages the first rotation member 51. Specifically, in the embodiment, the elastic sheet fixing portion 521 is a position limiting hole having a shape corresponding to the shape of the elastic sheet 533. Apart of the elastic sheet 533 is fixed to the inner side of the second rotation member 52. Apart of the elastic sheet 533 for engagement extends out of the position limiting hole and corresponds to the tooth-shaped structure 532. Preferably, the embodiment includes two elastic sheet fixing portions 521. The elastic sheet 533 includes two portions which are extending outside the fixing portions 521 and engage the tooth-shaped structure 532. When one of the two portions is located between two adjacent teeth of the tooth-shaped structure 532, the other portion presses against a tooth of the tooth-shaped structure 532. Therefore, the location accuracy of rotation can achieve a half of the teeth pitch of the tooth-shaped structure 532.

In a preferred embodiment of the present application, the first rotation member 51 and the second rotation member 52 utilize annular frames and connect to each other by utilizing the latching structure 54, thus to form a housing chamber by utilizing annular frame. The housing chamber may be used to host electric components, such as PCB, batteries, or the like, which avoids allocating additional space on the head-mounted display for such purpose. Preferably, an outer cover having a latching structure is arranged at the outer side of the housing chamber formed by the annular frames, which can be easily disassembled. Thus the components are allowed to be replaced, maintained, repaired, or the like easily.

However, as long as that the elastic sheet 533 is rotatably coupled to the tooth-shaped structure 532 and keeps engaging the tooth-shaped structure 532, the first rotation member 51 and the second rotation member 52 in the present application are not limited to annular frames. For example, one of the first rotation member 51 and the second rotation ember 52 which has the tooth-shaped structure 532 can be a frame having an outer rectangle wall and an inner circle wall, and the tooth-shaped structure is mounted to the inner circle wall. Accordingly, the other of the first rotation member 51 and the second rotation member 52 can be an embedded annular frame of the above embodiment, and it also can be a circular solid embedded in the circular space formed by the circle wall of one of the first rotation member 51 and the second rotation member having a tooth-shaped structure 532, and the elastic sheet 533 is arranged at the circle outer wall of the circular solid and engages the tooth-shaped structure 532 correspondingly. It is understood that, between the first rotation member 51 and the second rotation member 52, the one having the tooth-shaped structure 532 may be an annular frame having a smaller diameter, with the tooth-shaped structure 532 arranged at the outer circle wall of the annular frame. The other one of the first rotation member 51 and the second rotation member 52 having the elastic sheet 533 can be an inner circle wall corresponding to the outer circle wall of the first one of the first rotation member 51 and the second rotation member 52, and the shape of the second one of the first rotation member 51 and the second rotation member 52 having the elastic sheet 533 is not limited, which enables the tooth-shaped structure 532 to be embedded in the inner circle wall. The elastic sheet 533 extends through the inner circle wall and engages the tooth-shaped structure 532 of the embedded one of the first rotation member 51 and the second rotation member 52 having the tooth-shaped structure 532. An ordinary person skilled in the art constructs the relative engagement rotation of the first rotation member and the second rotation member according to the principles of the present application should be included in the scope of the present application.

In the embodiment, the opposite wall 51B of the first rotation member 51 is connected to the corresponding headphone body 31. Specifically, the headphone body 31 is connected to the first rotation member 51 by the fixing member 80. The fixing member 80 is fixed to the opposite wall 51B of the first rotation member 51, and the headphone body 31 is fixed to the fixing member 80. The specific fixing manner can be riveted joint, and also can be any fixing manner used in the art.

Figure 5:
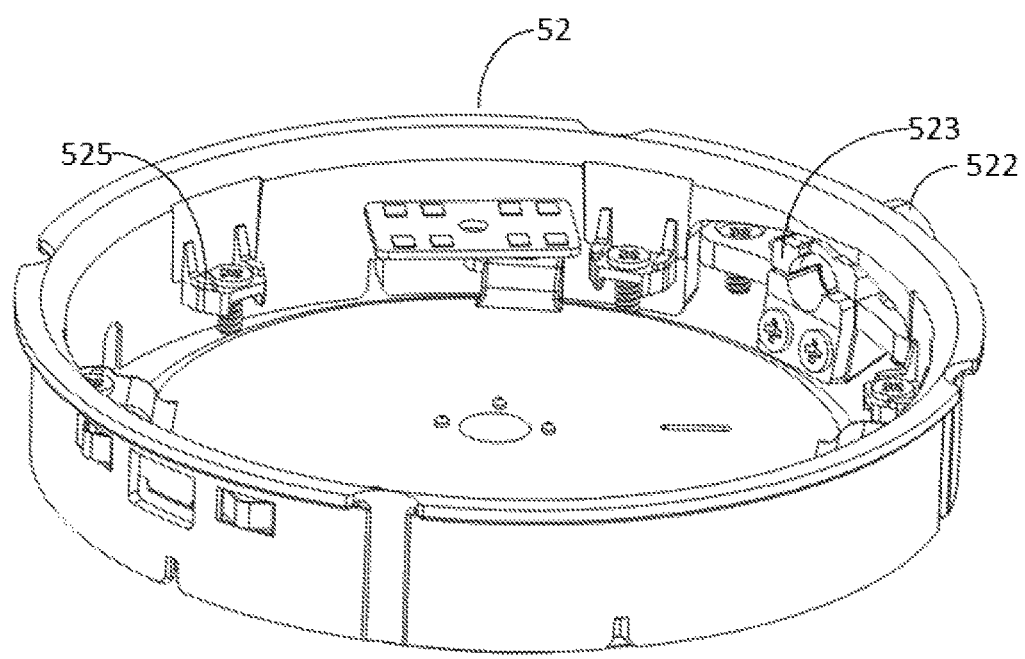
FIG. 5 is a perspective view of the second rotation member in FIG. 2.
Figure 6:
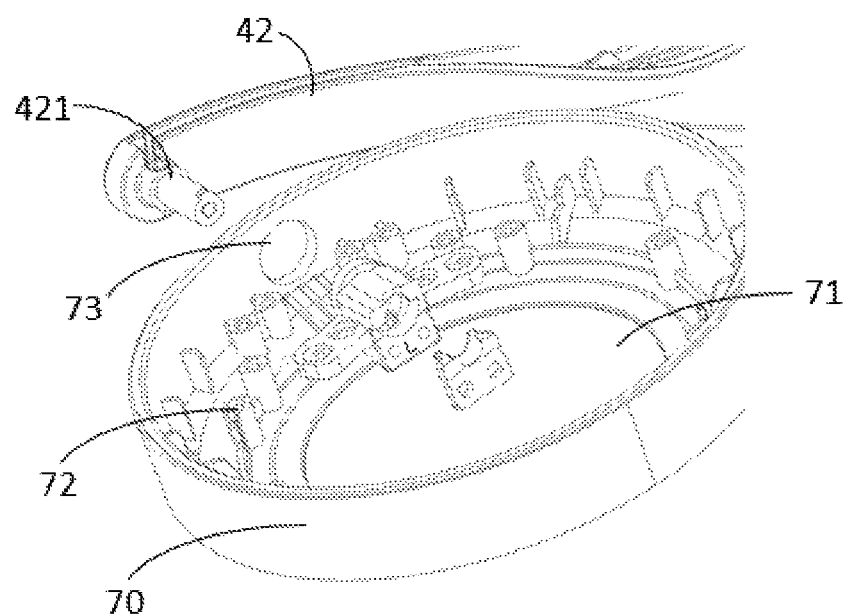
FIG. 6 is a perspective view showing the connection of a head-mounted bracket and the cover in accordance with another embodiment.

Preferably, the head-mounted display 10 further includes a touch panel 60. The touch panel 60 is arranged at the opposite wall 52B of the second rotation member 52. Specifically, referring to FIG. 6, the head-mounted display 10 further includes a cover 70. The cover 70 includes an opening 71 and a mounting portion 72. The touch panel 60 is fixed to the cover 70 and is exposed through the opening 71. The mounting portion 72 is fixed to the second rotation member 52. Specifically, as another embodiment of connection between the head-mounted bracket 40 and the connection mechanism 50 shown in FIG. 5, the second rotation member 52 includes a fixed connection portion 525 which, specifically, is a rivet fixing hole, and fixed to the mounting portion 72 of the cover 70 by rivets. In this embodiment, the connection end 42 of the head-mounted bracket 40 is pivotally connected to the cover 70 via a pivot 421. The cover 70 includes a pivot hole 73, which enables the pivot 421 of the connection end 42 to extend through the pivot hole 73 to be mounted in the cover 70.

In another embodiment, when there is no cover 70, the connection end of the head bracket 40 is pivotally connected to the second rotation member 52 via a pivot 421. Specifically, referring to FIG. 6, the second rotation member 52 includes a pivot hole 522, which enables the pivot 421 of the connection end 42 to extend through the pivot hole 522 from the outer side of the second rotation member 52, and is further fixed to the inner side of the second rotation member 52 by passing through the sleeve 523.

However, the connection manner between the connection end 42 of the head-mounted bracket 40 and the connection mechanism 50 is not limited to the above specific embodiment. Referring to FIG. 1, the connection end 42 of the head-mounted bracket 40 can be integrally formed in the second rotation member 52 or the cover 70, and it can also be connected to the second rotation member 52 or the cover 70 by an inserting manner, latching manner, or the like.

In the above preferable embodiment, the head-mounted display achieves rotatable connection by virtue of the latching structure 54 of the first rotation member 51 and the second rotation member 52 of the connection mechanism 50. The head-mounted bracket 40 is connected to the second rotation member 52, the support arms 22 of the display device 20 are connected to the first rotation member 51, which enables the display device 20 and the head-mounted bracket 40 to rotate relative to each other when the first rotation member 51 rotates relative to the second rotation member 52. The connection includes a direct connection, or an indirect connection via other component.

In the above embodiment, the gear structure 53 configures the first rotation member 51 and the second rotation member 52 to rotate relative to each other under damping, which enables the predefined fixed angle between the head-mounted portion 41 and the display body 21 being achieved. It is understood that structures which achieves the above function is not limited to the gear structure 53 of the present application. For example, the structures may be two rubbers, as long as that it causes the first rotation member 51 and the second rotation member 52 to rotate relative to each other under damping.

The foregoing description is only the preferred embodiments of the present application, but is not intended to limit the scope of the invention. Accordingly, any modification, alternatives, improvements or the like within the spirit and principles of the present application should be included in the scope of the present application.

What is claimed is:

1. A head-mounted display, comprising:
a display device comprising a display body and two support arms extending from opposite ends of the display body for displaying a video;
a headphone device comprising two headphone bodies for playing an audio synchronized with the video;
two connection mechanisms connected to the two support arms respectively and rotatably connected to the two headphone bodies respectively; and
a head-mounted bracket comprising a head-mounted portion and two connection portions extending from opposite ends of the head-mounted portion, wherein the two connection portions are connected to the two connection mechanisms respectively;
wherein each of the two connection mechanisms comprises a first rotation member connecting one of the two support arms to a corresponding one of the two headphone bodies and a second rotation member rotatably connected to the first rotation member, and the second rotation member is connected to a corresponding one of the two connection portions; and
wherein at least one of the two connection mechanism further comprises a damping structure for generating a damping force when the first rotation member and the second rotation member rotate relative to each other.

2. The head-mounted display as described in claim 1, wherein the damping structure comprises a gear structure, one of the first rotation member and the second rotation member comprises a circle wall having a tooth-shaped structure, and the other one of the first rotation member and the second rotation member comprises an elastic sheet engaging the tooth-shaped structure, and the first rotation member and the second rotation member rotate relative to each other by engaging the tooth-shaped structure and the elastic sheet under an external force.

3. The head-mounted display as described in claim 2, wherein each of the first rotation member and the second rotation member comprises a latching wall having a latching structure and a wall opposite to the latching wall; the gear structure is arranged at the latching wall.

4. The head-mounted display as described in claim 3, wherein each of the first rotation member and the second rotation member is an annular frame comprising an inner circle wall and an outer circle wall, the diameter of the first rotation member is different from the diameter of the second rotation member.

5. The head-mounted display as described in claim 4, wherein the diameter of the first rotation member is greater than the diameter of the second rotation member, and the first rotation member comprises a first joint portion extending from the latching wall toward a center of the annular frame, and a second joint portion extending from the first joint portion in a direction parallel to a central axis of the annular frame, and the second rotation member includes a third joint portion extending from the latching wall toward the center of the annular frame, the first joint portion is attached to the third joint portion.

6. The head-mounted display as described in claim 5, wherein the second joint portion of the first rotation member comprises a concentric annular ring extending from the annular frame, the concentric annular ring comprises an inner circle wall and an outer circle wall; the tooth-shaped structure is arranged on the inner circle wall of the concentric annular ring; the elastic sheet is fixed to the second rotation member, and the elastic sheet is engaged with the tooth-shaped structure when the third joint portion of the second rotation member pressed against the first joint portion by an interior side of the first rotation member.

7. The head-mounted display as described in claim 2, wherein the other one of the first rotation member and the second rotation member further comprises two elastic sheet fixing portions, the elastic sheet of the other one of the first rotation member and the second rotation member comprises two portions extending outside the two elastic sheet fixing portions and engaging the tooth-shaped structure, and one of the two portions is located between two adjacent teeth of the tooth-shaped structure, the other portion presses against a tooth of the tooth-shaped structure.

8. The head-mounted display as described in claim 2, wherein the headphone body is connected to the first rotation member.

9. The head-mounted display as described in claim 2, further comprising a touch panel, wherein the touch panel is arranged on the second rotation member.

10. The head-mounted display as described in claim 9, further comprising a cover, wherein the cover comprises an opening and a fixing portion, the touch panel fixed to the cover and exposed through the opening; the fixing portion fixed to the second rotation member.

11. The head-mounted display as described in claim 10, wherein a connection end of the head-mounted bracket is rotatably connected to the cover via a pivot.

12. The head-mounted display as described in claim 1, wherein a connection end of the head-mounted bracket is rotatably connected to the second rotation member via a pivot.

* * * * *